United States Patent
Lin et al.

(10) Patent No.: US 11,087,473 B2
(45) Date of Patent: *Aug. 10, 2021

(54) METHOD AND PIXEL ARRAY FOR DETECTING MOTION INFORMATION

(71) Applicant: PIXART IMAGING INC., Hsin-Chu (TW)

(72) Inventors: Han-Chang Lin, Hsin-Chu (TW); Shu-Sian Yang, Hsin-Chu (TW); Shih-Feng Chen, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 23 days.

This patent is subject to a terminal disclaimer.

(21) Appl. No.: 16/216,062

(22) Filed: Dec. 11, 2018

(65) Prior Publication Data
US 2019/0108644 A1    Apr. 11, 2019

Related U.S. Application Data

(63) Continuation of application No. 15/361,378, filed on Nov. 26, 2016, now Pat. No. 10,192,317.

(30) Foreign Application Priority Data

Jun. 17, 2016    (TW) .................. 105119125

(51) Int. Cl.
*G06T 7/20*    (2017.01)
*H04N 5/33*    (2006.01)
(Continued)

(52) U.S. Cl.
CPC ............ *G06T 7/20* (2013.01); *G06K 9/00335* (2013.01); *G06K 9/00355* (2013.01);
(Continued)

(58) Field of Classification Search
CPC .......... G06K 9/00335; G06K 9/00355; G06K 9/2018; G06K 9/22; G06T 2207/10016;
(Continued)

(56) References Cited

U.S. PATENT DOCUMENTS 6,374,681 B1    4/2002  Vanuytven
8,773,352 B1 *  7/2014  Huang ................ G09G 5/00
                                              345/156
(Continued)

FOREIGN PATENT DOCUMENTS

CN    101618277 A    1/2010
CN    102740003 A    10/2012
(Continued)

*Primary Examiner* — Ian L Lemieux
(74) *Attorney, Agent, or Firm* — Li & Cai Intellectual Property (USA) Office

(57) ABSTRACT

A method for detecting motion information includes the following steps. First, a pixel array is provided for detecting an image of a measured object located in a first distance range or in a second distance range, and the pixel array includes a plurality of invisible image sensing pixels and a plurality of visible image sensing pixels. Then, image detection is conducted within the first distance range by using the invisible image sensing pixels to output a plurality of invisible images. Next, the image detection is conducted within the second distance range by using the visible image sensing pixels to output a plurality of visible images. Then, the plurality of invisible images and the plurality of visible images are analyzed by using a processing unit, so as to obtain motion information of the measured object. A pixel array for detecting motion information and an image sensor are also provided.

1 Claim, 9 Drawing Sheets

(51) Int. Cl.
*H04N 5/369* (2011.01)
*G06K 9/22* (2006.01)
*G06K 9/20* (2006.01)
*G06K 9/00* (2006.01)
*H04N 5/14* (2006.01)

(52) U.S. Cl.
CPC ............ *G06K 9/2018* (2013.01); *G06K 9/22* (2013.01); *H04N 5/33* (2013.01); *H04N 5/332* (2013.01); *H04N 5/3698* (2013.01); *G06T 2207/10016* (2013.01); *H04N 5/144* (2013.01)

(58) Field of Classification Search
CPC . G06T 7/20; H04N 5/144; H04N 5/33; H04N 5/332; H04N 5/3698
See application file for complete search history.

(56) References Cited

U.S. PATENT DOCUMENTS

| | | | |
|---|---|---|---|
| 9,659,403 B1* | 5/2017 | Horowitz | G06T 7/70 |
| 9,817,485 B2* | 11/2017 | Ozawa | G06F 3/038 |
| 9,829,983 B2* | 11/2017 | Park | G06F 3/017 |
| 9,876,966 B2 | 1/2018 | Wang et al. | |
| 9,979,886 B2* | 5/2018 | Mandelli | H01L 27/14649 |
| 2003/0228032 A1 | 12/2003 | Chen | |
| 2004/0125072 A1 | 7/2004 | Gust | |
| 2005/0276475 A1 | 12/2005 | Sawada | |
| 2006/0266942 A1 | 11/2006 | Ikeda | |
| 2008/0079704 A1* | 4/2008 | Joshi | H04N 5/33 345/207 |
| 2008/0099678 A1* | 5/2008 | Johnson | G01J 5/02 250/332 |
| 2008/0191643 A1 | 8/2008 | Roberts et al. | |
| 2011/0175626 A1 | 7/2011 | Lee et al. | |
| 2011/0211754 A1* | 9/2011 | Litvak | G06K 9/00375 382/165 |
| 2013/0021507 A1 | 1/2013 | Wang et al. | |
| 2013/0162796 A1 | 6/2013 | Bharara et al. | |
| 2013/0229491 A1* | 9/2013 | Kim | G06F 3/017 348/46 |
| 2014/0111423 A1* | 4/2014 | Park | G06F 3/011 345/156 |
| 2014/0253429 A1 | 9/2014 | Dai et al. | |
| 2015/0062306 A1* | 3/2015 | Ayyagari | H04N 13/128 348/49 |
| 2016/0113517 A1 | 4/2016 | Lee et al. | |
| 2016/0373676 A1* | 12/2016 | Zhang | H04N 5/374 |

FOREIGN PATENT DOCUMENTS

| | | |
|---|---|---|
| CN | 103294182 A | 9/2013 |
| CN | 103677246 A | 3/2014 |

* cited by examiner

METHOD AND PIXEL ARRAY FOR DETECTING MOTION INFORMATION

CROSS-REFERENCE TO RELATED APPLICATIONS

This is a continuation application of prior application Ser. No. 15/361,378 filed on Nov. 26, 2016, currently pending.

BACKGROUND OF THE INVENTION

1. Field of the Invention

The instant disclosure relates to a method and pixel array for detecting motion information; in particular, to a method and pixel array for detecting motion information at far distance and near distance ranges simultaneously.

2. Description of Related Art

Electronic products are generally controlled by touch-control-type means. For example, a remote controller, a computer mouse, a touch screen, and the like. In recent years, for increasing the convenience of human machine interaction, the non-touch-control-type system such as gesture recognition system or voice control system has been gradually introduced into the consumer electronic products, e.g., a game machine, a smart TV, a smart phone, a media tablet, an automotive electronic product, and the like. The development of the gesture recognition system not only can expand the application of the human machine interaction, but also provide users with a more convenient and higher quality lifestyle.

However, when using the conventional gesture recognition system to detect motion information, e.g., gesture motion, approaching detection, and even other object sensing only can conduct single functional object detection. For example, when determining if the gesture image is located at a near distance or far distance, if the gesture image located at the near distance can be detected then the gesture image located at the far distance cannot be detected, and vice versa.

Therefore, in order to increase the flexibility of the gesture recognition system, how to overcome the problem of the alternating between the gesture recognition at a near distance and the gesture recognition in far distance is one of the important issues in the art.

SUMMARY OF THE INVENTION

Due to the above insufficient technique in the prior art, the instant disclosure addresses the technical problem of providing a method and pixel array for detecting motion information at a far distance and near distance ranges simultaneously.

To address the abovementioned technical problem, one of the embodiments of this instant disclosure provides a method for detecting motion information including the following steps. First, a pixel array is provided for detecting an image of a measured object located in a first distance range or in a second distance range, and the pixel array includes a plurality of invisible image sensing pixels and a plurality of visible image sensing pixels. Then, image detection is conducted within the first distance range by using the invisible image sensing pixels to output a plurality of invisible images. Next, the image detection is conducted within the second distance range by using the visible image sensing pixels to output a plurality of visible images. Then, the plurality of invisible images and the plurality of visible images are analyzed by using a processing unit, so as to obtain motion information of the measured object.

Another embodiment of this instant disclosure provides a pixel array for detecting motion information. The pixel array includes a plurality of invisible image sensing pixels and a plurality of visible image sensing pixels for detecting an image of a measured object located in a first distance range or in a second distance range. Image detection within the first distance range is conducted by the plurality of invisible image sensing pixels to output a plurality of invisible images, and the image detection within the second distance range is conducted by the plurality of visible image sensing pixels to output a plurality of visible images. A processing unit includes a first algorithmic unit and a second algorithmic unit. The first algorithmic unit and the second algorithmic unit are respectively used to analyze the plurality of invisible images and the plurality of visible images, so as to obtain motion information of the measured object.

Yet another embodiment of this instant disclosure provides an image sensor which includes a pixel array and a processing unit. The pixel array includes a plurality of first image sensing pixels and a plurality of second image sensing pixels, the plurality of first image sensing pixels is used to detect a light within a visible light wavelength range, the plurality of second image sensing pixels is used to detect a light within an invisible light wavelength range, and a number of the plurality of first image sensing pixels is more than a number of the plurality of second image sensing pixels. The processing unit is used to output image information depending on a data detected by the plurality of first image sensing pixels under a first mode, and output object moving information depending on the data detected by the plurality of second image sensing pixels under a second mode.

Yet another embodiment of this instant disclosure provides an image sensor which includes a pixel array and a processing unit. The pixel array includes a plurality of first image sensing pixels and a plurality of second image sensing pixels, and a number of the plurality of first image sensing pixels is more than a number of the plurality of second image sensing pixels. The processing unit is used to output image information depending on a data detected by the plurality of first image sensing pixels under a first mode, and determines whether to switch from a second mode to the first mode depending on the data detected by the plurality of second image sensing pixels under the second mode.

This instant disclosure has the benefit that, in this instant disclosure, by providing a method and pixel array for detecting motion information at a far distance and near distance ranges simultaneously, it can detect the motion information (e.g., gesture image) at a near distance and far distance at the same time, so as to obtain a plurality of invisible images and a plurality of visible images that are alternatively arranged with each other. Therefore, the problem detecting the gesture image using the conventional gesture recognition system which can only conduct the alternative between near distance detection and far distance detection for detecting the gesture image, and cannot conduct the near distance detection and the far distance detection at the same time can be solved.

In addition, in the method of detecting the gesture at far and near distances of this instant disclosure, an infrared light is used to emphasize determining a gravity center of the gesture image under a near distance condition, so as to increase an accuracy of determining the gesture image, and the limitation in the conventional gesture determination means can be overcome.

Furthermore, in the embodiment of the instant disclosure, when the image sensor is under the second mode, the first image sensing pixels are in the resting state, and when the data detected by the second image sensing pixels is the moving information, the mode is switched from the second mode to the first mode. Switching between the second mode and the first mode can save the power consumption of the image sensor.

In order to further appreciate the characteristics and technical contents of the present invention, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF THE PREFERRED EMBODIMENTS

Embodiments of the instant disclosure are illustrated via specific examples as follows, and people familiar in the art may easily understand the advantages and efficacies of the instant disclosure by disclosure of the specification. The instant disclosure may be implemented or applied by other different specific examples, and each of the details in the specification may be applied based on different views and may be modified and changed under the existence of the spirit of the instant disclosure. The figures in the instant disclosure are only for brief description, but they are not depicted according to actual size and do not reflect the actual size of the relevant structure. The following embodiments further illustrate related technologies of the instant disclosure in detail, but the scope of the instant disclosure is not limited herein.

First Embodiment

Figure 1:
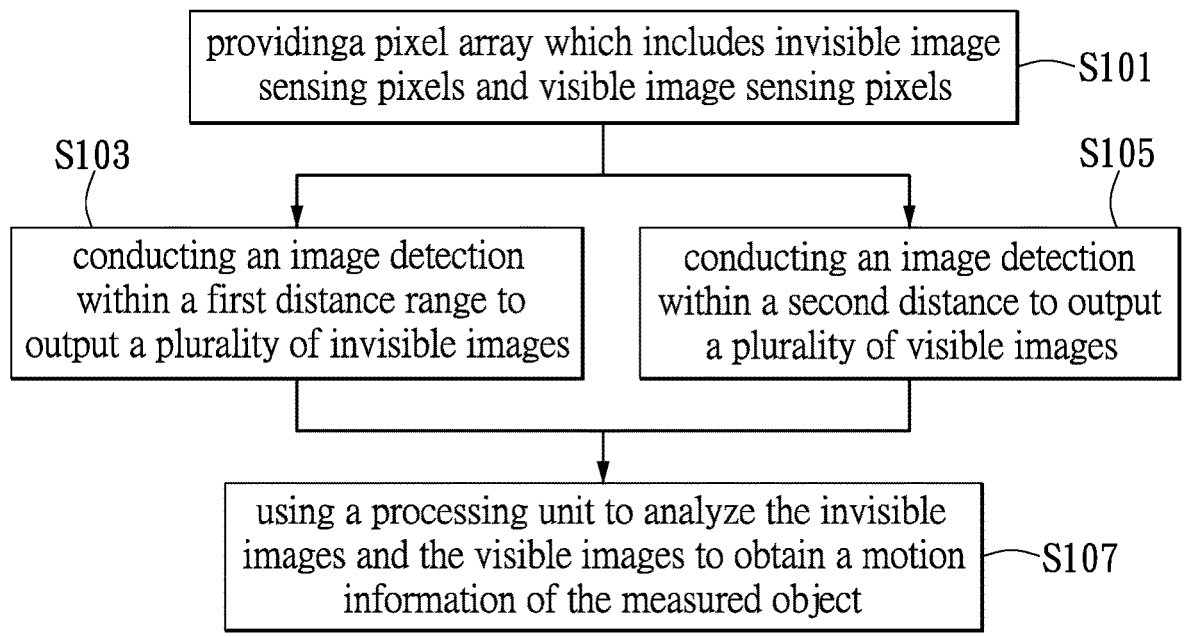
FIG. 1 shows a flow chart of a method for detecting motion information of an embodiment in the instant disclosure.
Figure 2:
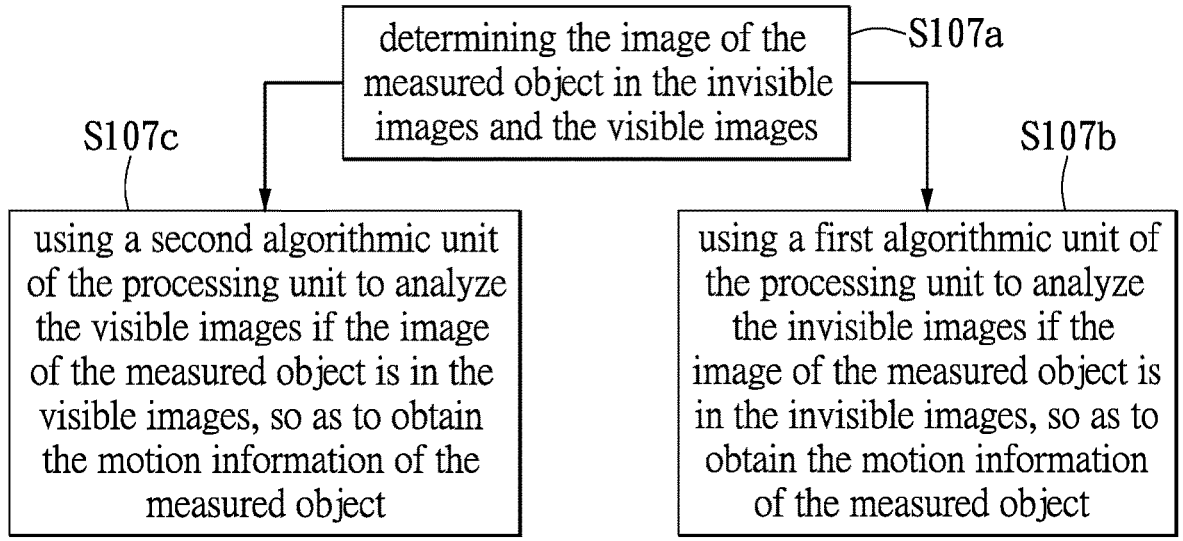
FIG. 2 shows a flow chart of further steps in the step S107 of a method for detecting motion information of an embodiment in the instant disclosure.

Please refer to FIGS. 1 to 4. FIG. 1 shows a flow chart of a method for detecting motion information of the first embodiment in the instant disclosure, and FIG. 2 shows a flow chart of the first algorithmic unit 21 and the second algorithmic unit 22 of the first embodiment in this instant disclosure being used to respectively analyze the invisible images and the visible images.

Figure 3:
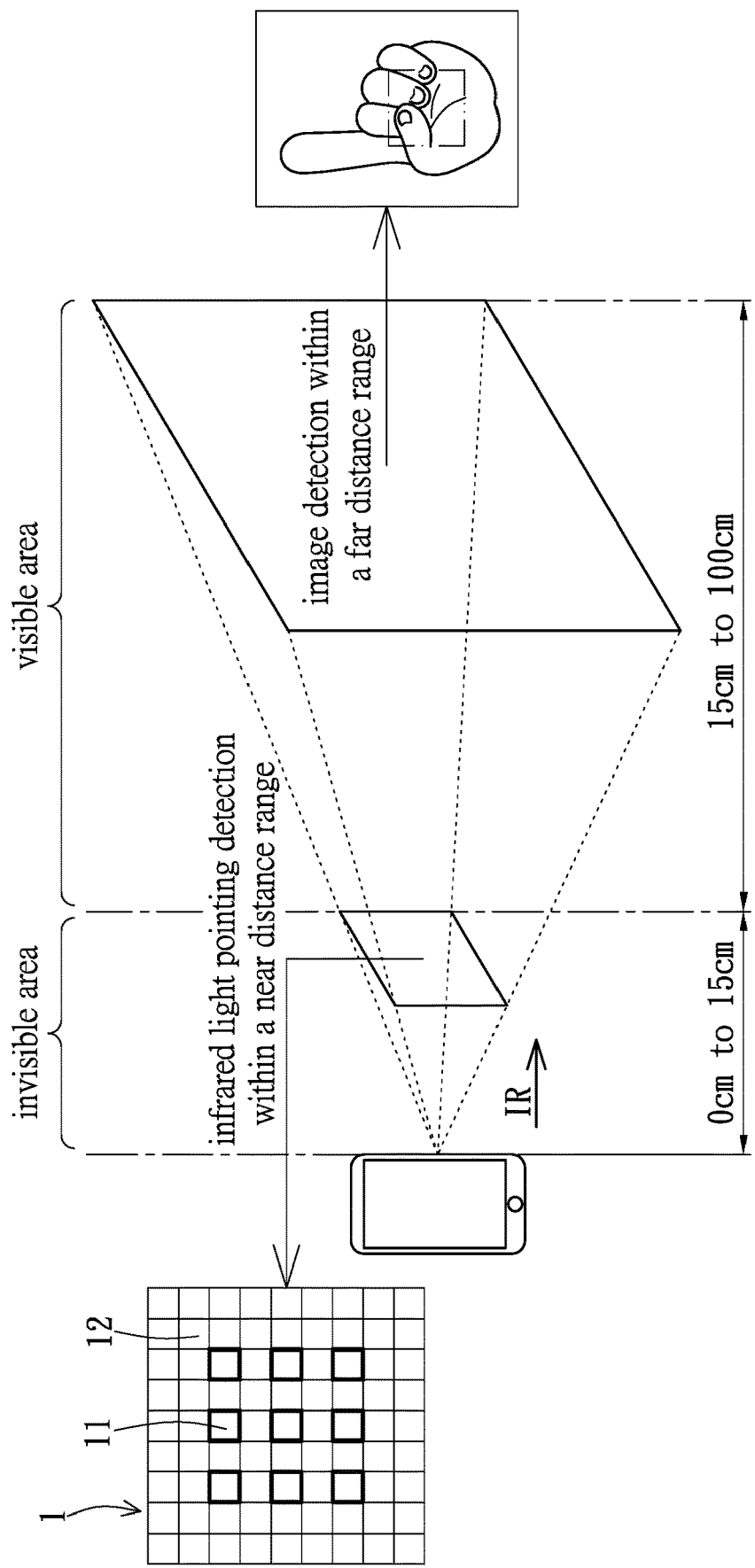
FIG. 3 shows a schematic view of use of a method for detecting motion information of an embodiment in the instant disclosure.
Figure 4:
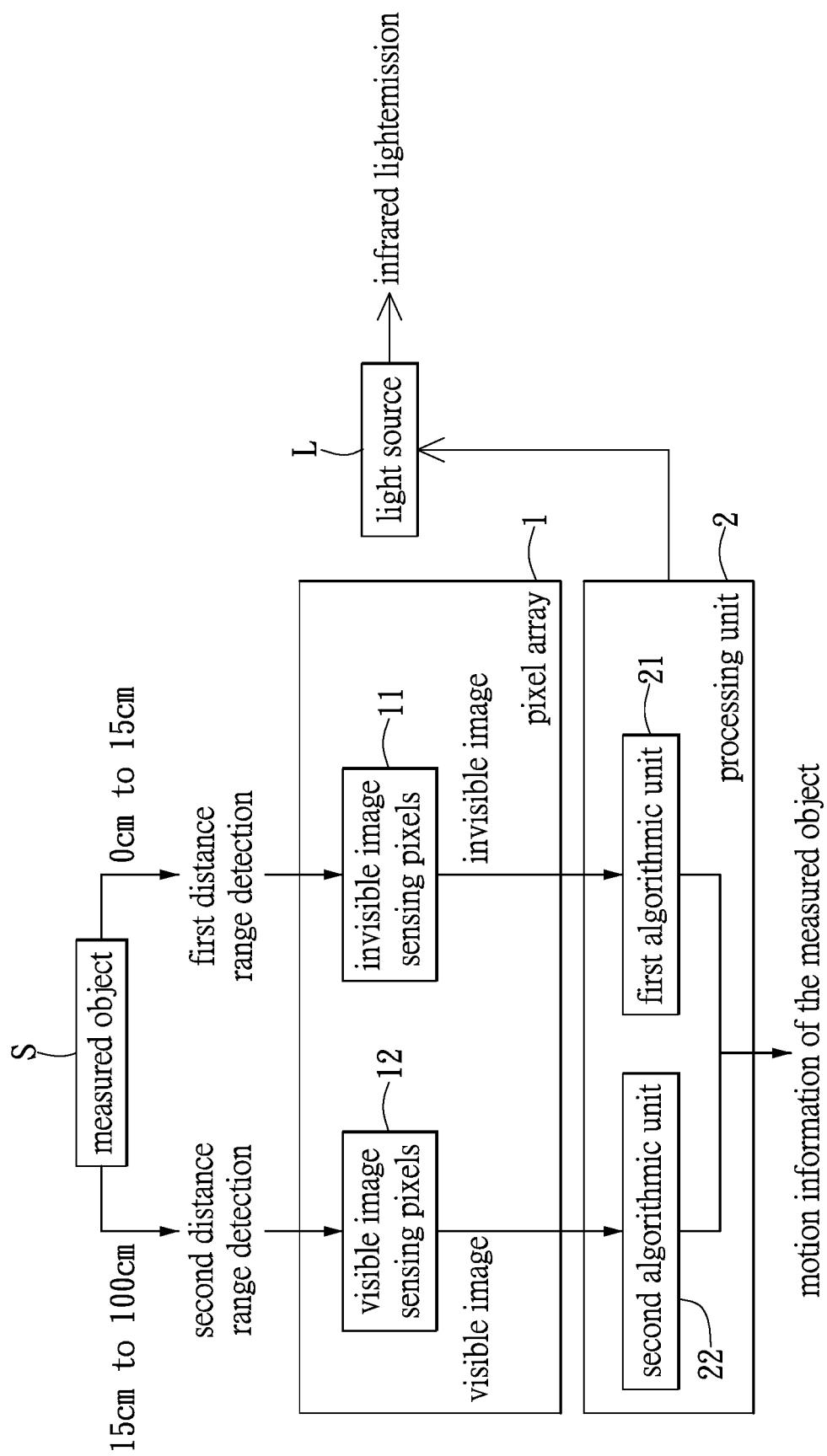
FIG. 4 shows a functional block diagram of a method for detecting motion information of an embodiment in the instant disclosure.

As shown in Steps S101 to S107 in FIG. 1 and FIGS. 3 to 4, the first embodiment of this instant disclosure provides a method for detecting motion information including the following steps. First, a pixel array 1 is provided for detecting an image of a measured object S such as a gesture located in a first distance range or in a second distance range as shown in Step S101. In this embodiment, the pixel array 1 includes a plurality of invisible image sensing pixels 11 and a plurality of visible image sensing pixels 12, as shown in FIG. 3 and FIG. 4. As an illustration, a number of the plurality of invisible image sensing pixels 11 is nine in this embodiment, but it is not limited herein. It will be respectively described according to different detection distances as follows.

A light source L (e.g., Infrared; IR) is provided to the plurality of invisible image sensing pixels 11 to conduct image detection, such that a plurality of invisible images is outputted, and it is determined whether the measured object S is in the first distance range or not, as shown in Step S103 and FIG. 4. Next, the image detection is conducted within the second distance range by using the plurality of visible image sensing pixels 12 without a light source L to output a plurality of visible images, so as to determine the measured object S being in the second distance range or not, as shown in Step S105 and FIG. 4.

Specifically, the determination of the measured object S being in the first distance range or in the second distance range is conducted by a processing unit 2 which analyzes the plurality of invisible images and the plurality of visible images to obtain motion information of the measured object S, as shown in Step S107.

The abovementioned Step S107 can contain Steps S107(a) to S107(c), as shown in FIG. 2, and is described as follows.

In the Step S107(a), the processing unit 2 can be used to determine the measured object S is in or not in the plurality of invisible images and the plurality of visible images. If the processing unit 2 determines the measured object S is in the plurality of invisible images, a first algorithmic unit 21 of the processing unit 2 is used to analyze the plurality of invisible images, so as to obtain the motion information of the measured object S, as shown in the Step S107(b). If the processing unit 2 determines the measured object S is in the plurality of visible images, and a second algorithmic unit 22 of the processing unit 2 is used to analyze the plurality of visible images, so as to obtain the motion information of the measured object S, as shown in the Step S107(c).

Referring to FIG. 3 and FIG. 4, in an embodiment of this instant disclosure, a "gesture image" is used for illustrating the motion information, the first distance range is between 0 cm to 15 cm, and the second distance range is between 15 cm to 100 cm. Preferably, the first distance range is between 1 cm to 15 cm, and the second distance range is between 15 cm to 80 cm.

Specifically, when the first algorithmic unit 21 and the second algorithmic unit 22 are respectively used to analyze the plurality of invisible images and the plurality of visible images, it can determine if the gesture image is appearing in the plurality of invisible images or in the plurality of visible images first. If the gesture image is appearing in the plurality of invisible images, the first algorithmic unit 21 can be used to analyze the plurality of invisible images to obtain the motion information of the gesture therein. If the gesture image is appearing in the plurality of visible images, the second algorithmic unit 22 can be used to analyze the plurality of visible images to obtain the motion information of the gesture therein. More specifically, the processing unit 2 can include the first algorithmic unit 21 and the second algorithmic unit 22, the first algorithmic unit 21 contains a first algorithm, and the second algorithmic unit 22 contains a second algorithm. In this way, the plurality of invisible images and the plurality of visible images are respectively analyzed by the first algorithm and the second algorithm of the processing unit 2, so as to obtain the motion information of the gesture image.

In this embodiment, an infrared light is provided to the plurality of invisible image sensing pixels 11 to conduct the image detection within a near distance range of the first distance range between 0 cm to 15 cm. In another implemented embodiment, the infrared light is not provided to the plurality of visible image sensing pixels 12 to conduct the image detection within a far distance range of the second distance range between 15 cm to 100 cm. It should be noted that the plurality of invisible image sensing pixels 11 and the plurality of visible image sensing pixels 12 can conduct the abovementioned image detection simultaneously.

It should be noted, the processing unit 2 can be a hardware architecture that is the abovementioned algorithmic unit integrating a physical circuit and the pixel array 1 into one single chip. In such a way, although it decreases flexibility of the algorithm, it can relatively enhance calculating efficiency, such that size and energy consumption can be further minimized.

Figure 5A:
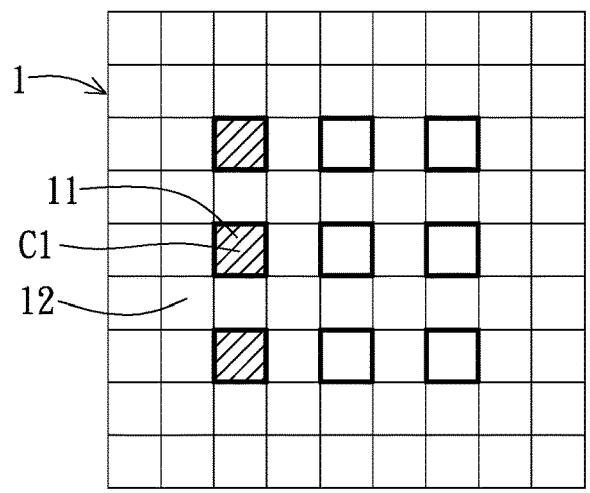
FIG. 5A to 5C shows a schematic view of points taken by invisible image sensing pixels of an embodiment in the instant disclosure.
Figure 5B:
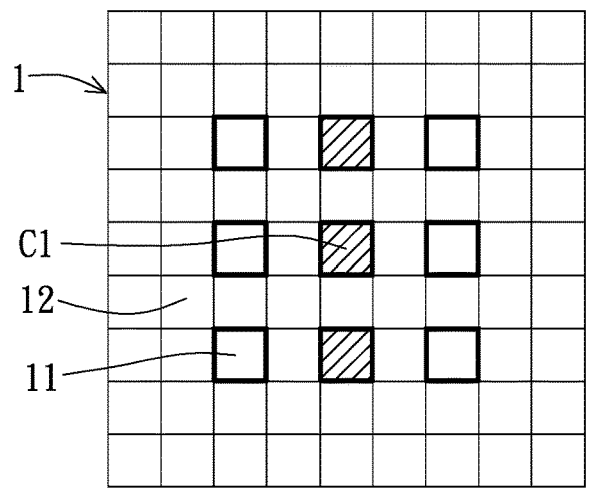
Figure 5C:
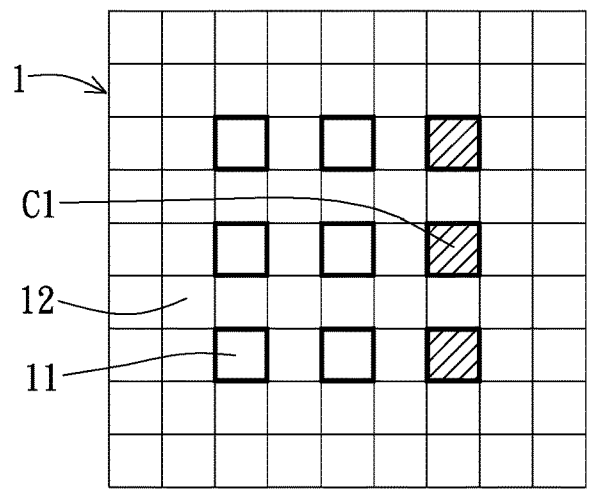

Referring to FIG. 4 and FIGS. 5A to 5C, according to different distances, the relative algorithmic ways are illustrated in detail as follows. FIG. 4 shows a functional block diagram of a method for detecting motion information of this embodiment in the instant disclosure, and FIG. 5A to 5C shows a schematic view of points taken by the plurality of invisible image sensing pixels 11 of an embodiment in the instant disclosure.

When the image detection is conducted by the plurality of invisible image sensing pixels 11 with the light source L within the first distance range, if the measured object S is located in the first distance range, the plurality of invisible image sensing pixels 11 can detect reflected lights reflected from the measured object S, as shown in FIG. 5A. At this time, when the measured object S is moving, the reflected lights reflected from the measured object S being detected by the plurality of invisible image sensing pixels 11 will show a movement state as like as FIG. 5B and FIG. 5C.

Specifically, the processing unit 2 receives the image information of the plurality of invisible image sensing pixels 11 to accordingly calculate the image gravity center of the measured object S. Thus, when the measured object S is moving in the first distance range, an image gravity center C1 of the measured object S will move along therewith to obtain a moving track. In this embodiment, the method for conducting the image detection by the plurality of invisible image sensing pixels 11 can be an image points taken method, and the abovementioned infrared light can be used to enhance determining the image gravity center C1 of the gesture. When the gesture is moving, the image gravity center C1 will form into one moving track. At this time, the moving track of the gesture can be tracked by the processing unit 2 via the algorithm, so as to increase the accuracy of the gesture determination.

For example, as shown in the pixel array 1 in FIGS. 5A to 5C, the plurality of invisible image sensing pixels 11 can be the pixels that can sense an infrared light or a far-infrared light. In this way, when the measured object S such as a hand appears in the first distance range between 0 cm to 15 cm, the infrared light irradiates the hand and a reflection occurs, and the plurality of invisible image sensing pixels 11 disposed on the pixel array 1 sense the reflected light. At this time, the processing unit 2, according to the data detected by the plurality of invisible image sensing pixels 11, uses the algorithm to calculate the image gravity center of the hand, so as to track the moving track of the hand. More specifically, if the gesture waves from left to right, first the reflected light passes the leftmost line of the plurality of invisible image sensing pixels 11 on the pixel screen, then passes the lines from left to right of the plurality of invisible image sensing pixels 11 sequentially (as shown in FIGS. 5A to 5C), and the gesture is calculated by the first algorithm of the first algorithmic unit 21 (as shown in FIG. 4) of the processing unit 2 to determine the gesture being waving from left to right, so as to obtain the motion information of the gesture.

When the gesture is located in the second distance range between 15 cm to 100 cm, the image detection is conducted by the plurality of visible image sensing pixels 12. The method for conducting the image detection can be a complete image capture method, the light source L is not necessary to be used in this embodiment, the plurality of visible image sensing pixels 12 can directly frame the shape of the gesture, and the moving track of the hand is tracked. For example, when a finger is outstretched, the plurality of visible image sensing pixels 12 can detect the shape of the finger and it is displayed on the screen, and the moving track of the hand starts to be tracked, for instance, when the moving track generated by the hand waving is from left to right, the gesture being waving from left to right can be obtained by the second algorithm of the second algorithmic unit 22 of the processing unit 2, so as to obtain the motion information of the complete gesture image.

In this embodiment, the plurality of invisible images and the plurality of visible images can be alternatively obtained by the plurality of invisible image sensing pixels 11 and the plurality of visible image sensing pixels 12. For example, there are two parts of information being generated at the same time, the first part is the first distance image information obtained from the first distance range between 0 cm to 15 cm, the second part is the second distance image information obtained from the second distance range between 15 cm to 100 cm, and the first distance image information and the second distance image information are alternative with each other. Specifically, the plurality of invisible images is arranged into odd-numbered images listed in first, third, fifth, . . . , and n−1, the plurality of visible images is arranged into even-numbered images listed in second, fourth, sixth, . . . , and n, and n is a positive integer. For example, 200 pieces of gesture images are obtained in one second, the plurality of invisible images are odd-numbered images that are sequenced into $1^{st}$, $3^{rd}$, $5^{th}$, . . . , $199^{th}$, and the plurality of visible images are even-numbered images that are sequenced into $2^{nd}$, $4^{th}$, $6^{th}$, . . . , $200^{th}$. In another embodiment, the plurality of invisible image sensing pixels 11 and the plurality of visible image sensing pixels 12 can obtain the abovementioned invisible images and the abovementioned visible images simultaneously.

Second Embodiment

The method for detecting motion information of the second embodiment of this instant disclosure is similar with the method for detecting motion information of the first embodiment of this instant disclosure, and the similarities are not repeated here. Please refer to FIG. 4, the difference between the method for detecting motion information of the second embodiment and the method for detecting motion information of the first embodiment in this instant disclosure is that, in the method for detecting motion information of the second embodiment of this instant disclosure, the processing unit 2 outputs an image information depending on a data detected by the plurality of visible image sensing pixels 12 under a first mode, and the processing unit 2 outputs an object moving information depending on the data detected by the plurality of invisible image sensing pixels 11 under a second mode.

Specifically, in the second mode, the plurality of visible image sensing pixels 12 are in a resting state but the plurality of invisible image sensing pixels 11 are in a working state, and the second mode can be a standby mode. In this way, when the data detected by the plurality of invisible image sensing pixels 11 is the object moving information, the processing unit 2 initiates the plurality of visible image sensing pixels 12 entering into the first mode. In the first mode, the plurality of visible image sensing pixels 12 is in the working state, at this time, the plurality of invisible image sensing pixels 11 can be in the working state simultaneously or also can be in the resting state, and the first mode is a normal mode. In detail, in the first mode, if the plurality of invisible image sensing pixels 11 and the plurality of visible image sensing pixels 12 are both in the working state, this would mean that it would not be necessary to turn off the plurality of invisible image sensing pixels 11, such that the electronic circuit design would be simpler.

If the plurality of invisible image sensing pixels 11 enter into the resting state when in the first mode, although the electronic circuit design would be more complex since it needs a switching mechanism, the overall energy consumption can be saved. For example, when the pixel array 1 and the processing unit 2 in this instant disclosure are set in a car camera (e.g., event data recorder), it enters into the second mode under a parking state that is the standby mode. Since it does not need to conduct recording, only the plurality of invisible image sensing pixels 11 are opened and the plurality of visible image sensing pixels 12 enter into the resting state. When the plurality of invisible image sensing pixels 11 detect the image changing if the car is activated or there are people passing through, an image sensor switches the mode from the second mode into the first mode, and the plurality of visible image sensing pixels 12 awaken, and the processing unit 2 would initiate the plurality of visible image sensing pixels 12 to conduct an image shooting or recording.

Third Embodiment

Figure 6:
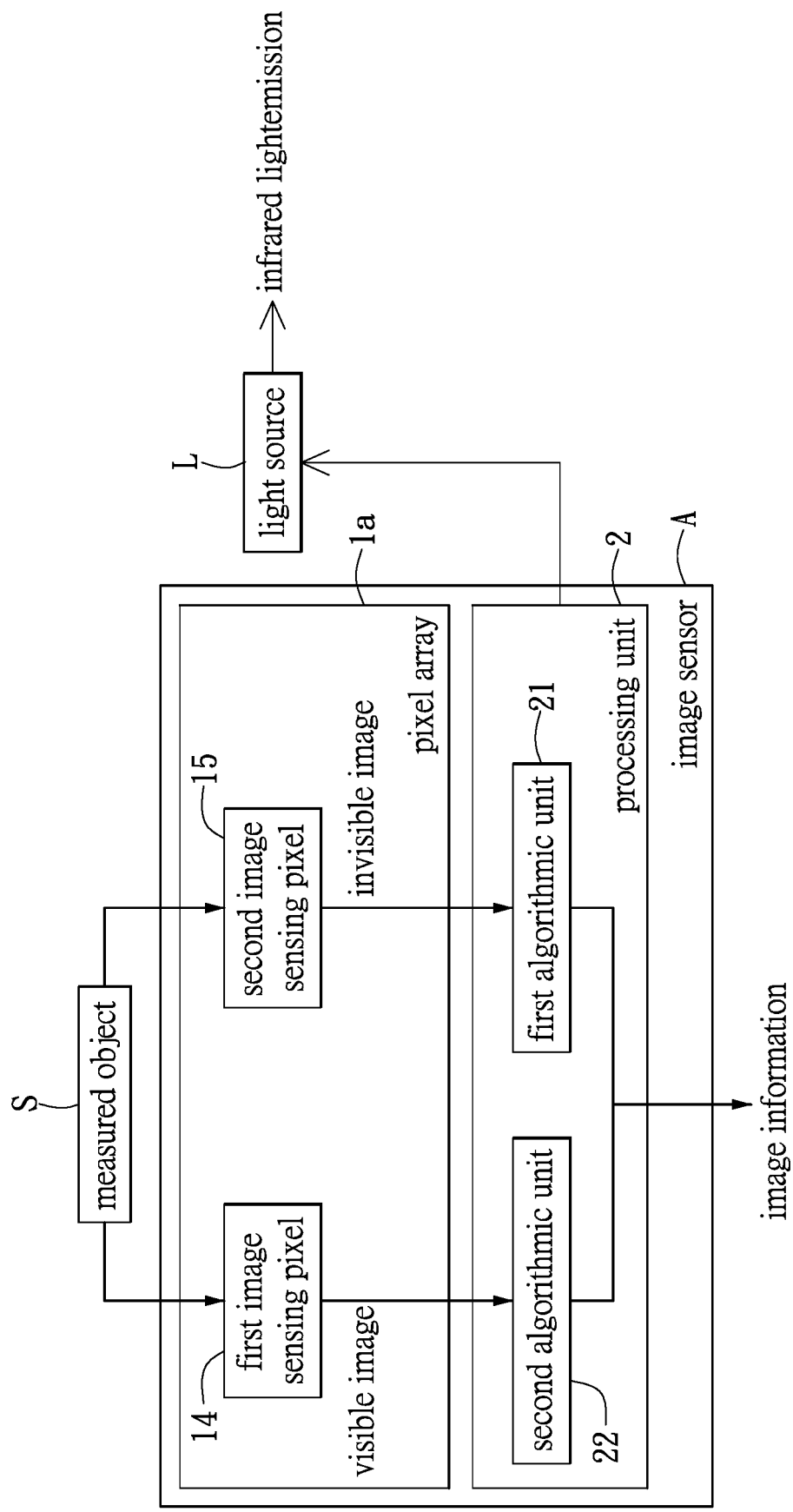
FIG. 6 shows a functional block diagram of detecting a measured object of an embodiment in the instant disclosure.
Figure 7:
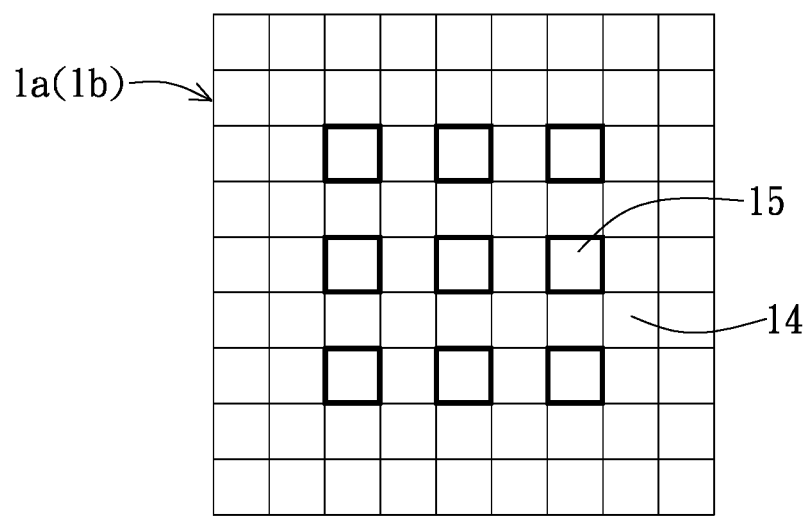
FIG. 7 shows a pixel array of an image sensor of an another embodiment in the instant disclosure.

Please refer to FIG. 6 to FIG. 7 and FIGS. 5A to 5C. FIG. 6 shows a functional block diagram of detecting a measured object of a third embodiment in the instant disclosure and FIG. 7 shows a pixel array 1a of an image sensor A of the third embodiment in the instant disclosure. The third embodiment in this instant disclosure provides an image sensor A which includes a pixel array 1a and a processing unit 2. The pixel array 1a includes a plurality of first image sensing pixels 14 and a plurality of second image sensing pixels 15, the plurality of first image sensing pixels 14 is used to detect a light within a visible light wavelength range, the plurality of second image sensing pixels 15 is used to detect a light within an invisible light wavelength range, and a number of the plurality of first image sensing pixels 14 is more than a number of the plurality of second image sensing pixels 15. The reason for this is, the image detected by the plurality of first image sensing pixels 14 is in the visible light wavelength range and is a pixel array generally used for photography, and so it shows the image that we usually see. The image detected by the plurality of second image sensing pixels 15 is in the invisible light wavelength range, and the method for conducting the image detection is after using the abovementioned image points taken method to determine the image gravity center C, a movement of the object is tracked. By this way, the moving track of the object is shown, and a complete image is not necessarily used. Hence, the number of the plurality of first image sensing pixels 14 is more than the number of the plurality of second image sensing pixels 15.

In addition, the processing unit 2 is used to output image information depending on data detected by the plurality of first image sensing pixels 14 under a first mode, and output object moving information depending on the data detected by the plurality of second image sensing pixels 15 under a second mode. The plurality of first image sensing pixels 14 include at least two of a red light sensing pixel, a green light sensing pixel and a blue light sensing pixel, and the plurality of second image sensing pixels 15 include at least one of an infrared light sensing pixel and a far-infrared light sensing pixel. Since the plurality of first image sensing pixels 14 includes at least two of the red light sensing pixel, the green light sensing pixel and the blue light sensing pixel, after the plurality of first image sensing pixels 14 detect the data, the image information outputted by the plurality of first image sensing pixels 14 is a full-color image information under the first mode. Since the plurality of second image sensing pixels 15 include the infrared light sensing pixel and the far-infrared light sensing pixel, after the plurality of second image sensing pixels 15 detect the data, the object moving information outputted by the plurality of second image sensing pixels 15 is a track of the movement of the object under the second mode. In this embodiment, the first mode can be a normal mode and the second mode can be a standby mode.

The plurality of first image sensing pixels 14 can be the same or different from the plurality of visible image sensing pixels 12 of the first and second embodiments in this instant disclosure, and the plurality of second image sensing pixels 15 can be the same or different from the plurality of invisible image sensing pixels 11 of the first and second embodiments in this instant disclosure. In the third embodiment of this instant disclosure, the structure, function, and action mechanism of the plurality of first image sensing pixels 14 are similar to that of the plurality of visible image sensing pixels 12 of the first and second embodiments in this instant disclosure, and the structure, function, and action mechanism of the plurality of second image sensing pixels 15 are similar to that of the plurality of invisible image sensing pixels 11 of the first and second embodiments in this instant disclosure. Therefore, the similarities are not repeated herein.

Fourth Embodiment

Figure 8:
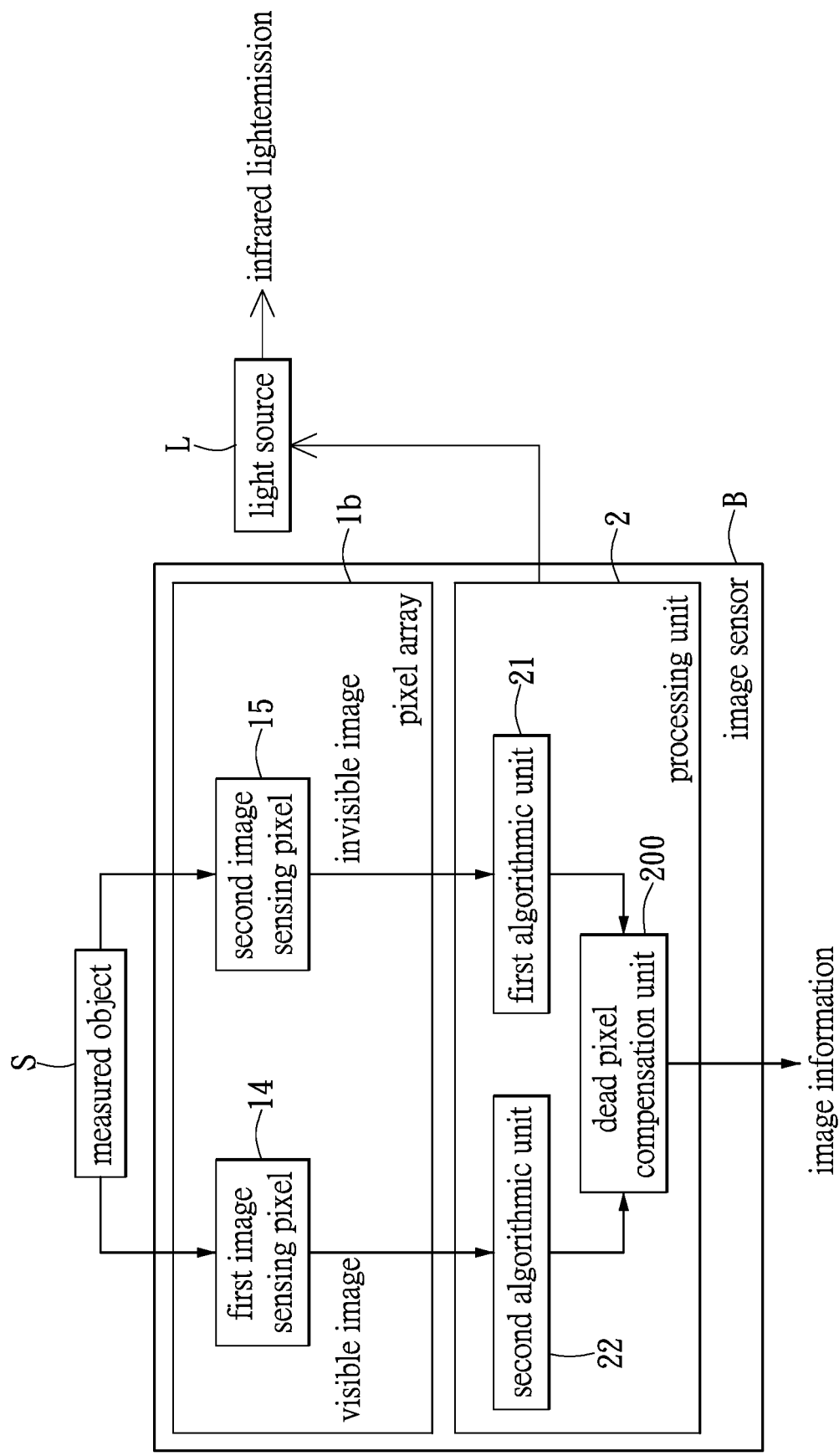
FIG. 8 shows a functional block diagram of detecting a measured object of an another embodiment in the instant disclosure.

Please refer to FIG. 8 and FIG. 7. FIG. 8 shows a functional block diagram of detecting a measured object of a fourth embodiment in the instant disclosure. FIG. 7 also shows a pixel array 1b of an image sensor B of the fourth embodiment in the instant disclosure. The fourth embodiment of this instant disclosure provides an image sensor B which includes a pixel array 1b and a processing unit 2. The pixel array 1b includes a plurality of first image sensing pixels 14 and a plurality of second image sensing pixels 15, and a number of the plurality of first image sensing pixels 14 is more than a number of the plurality of second image sensing pixels 15. The processing unit 2 is used to output image information depending on a data detected by the plurality of first image sensing pixels 14 under a first mode, and outputs object moving information depending on the data detected by the plurality of second image sensing pixels 15 under a second mode. Specifically, the processing unit 2 does not process the data detected by the plurality of first image sensing pixels 14 under the second mode, and does not process the data detected by the plurality of second image sensing pixels 15 under the first mode. That is, in the second mode, the plurality of first image sensing pixels 14 is in a resting state but the plurality of second image sensing pixels 15 is in a working state, and the second mode can be a standby mode. In such a way, when the data detected by the plurality of second image sensing pixels 15 is the object moving information, the processing unit 2 initiates the plurality of first image sensing pixels 14 entering into the first mode. In the first mode, the plurality of first image sensing pixels 14 are in the working state, at this time, the plurality of second image sensing pixels 15 can be in the working state simultaneously or also can be in the resting state, and the first mode is a normal mode. In more detail, in the first mode, if the plurality of second image sensing pixels 15 and the plurality of first image sensing pixels 14 are both in the working state, this would mean it would not be necessary to turn off the plurality of second image sensing pixels 15, such that the electronic circuit design would be simpler.

If the plurality of second image sensing pixels 15 enter into the resting state when in the first mode, although the electronic circuit design would be more complex since it needs a switching mechanism, the overall energy consumption can be saved.

Furthermore, the image sensor B of the fourth embodiment in this instant disclosure further includes a dead pixel compensation unit 200. In more detail, in the first mode, if the plurality of first image sensing pixels 14 and the plurality of second image sensing pixels 15 are in the working state, the processing unit 2 outputs an image information depending on the data detected by the plurality of first image sensing pixels 14 such that the image information represents a visible image, and the processing unit 2 outputs an object moving information depending on the data detected by the plurality of second image sensing pixels 15 such that the object moving information represents an invisible image, thus dead pixels appear on the screen at the last. This is because the positions disposed with the plurality of second image sensing pixels 15 do not generate the visible image in the pixel array 1b, hence there are discontinuous places that appear on the whole screen which is displaying the visible image thereon, and these parts are called dead pixels. The dead pixel compensation unit 200 included by the image sensor B of the fourth embodiment in this instant disclosure has a function of dead pixel compensation, it can fix these dead pixels, such that the image sensor B is available to output a normal screen.

Although FIG. 8 shows the dead pixel compensation unit 200 can receive the data of the first algorithmic unit 21 and the second algorithmic unit 22, in actuality, the dead pixel compensation unit 200 also can directly receive the data of the plurality of first image sensing pixels 14 or only receive the data of the first algorithmic unit 21, so as to output the normal screen. It depends on the design requirements of users, and is not limited herein. That is, a compensation is conducted first and a calculation of the algorithm is then conducted, or the calculation of the algorithm is conducted first and the compensation is then conducted so that it can be flexibily adjusted. This embodiment is only described for illustration, and it is not limited thereto.

In addition, the plurality of first image sensing pixels 14 can be the same or different from the plurality of visible image sensing pixels 12 of the first and second embodiments in this instant disclosure, and the plurality of second image sensing pixels 15 can be the same or different with the plurality of invisible image sensing pixels 11 of the first and second embodiments in this instant disclosure. In the fourth embodiment of this instant disclosure, the structure, function, and action mechanism of the plurality of first image sensing pixels 14 are similar to that of the plurality of visible image sensing pixels 12 of the first and second embodiments in this instant disclosure, and the structure, function, and action mechanism of the plurality of second image sensing pixels 15 are similar to that of the plurality of invisible image sensing pixels 11 of the first and second embodiments in this instant disclosure. Therefore, the similarities are not repeated herein.

Fifth Embodiment

Figure 9:
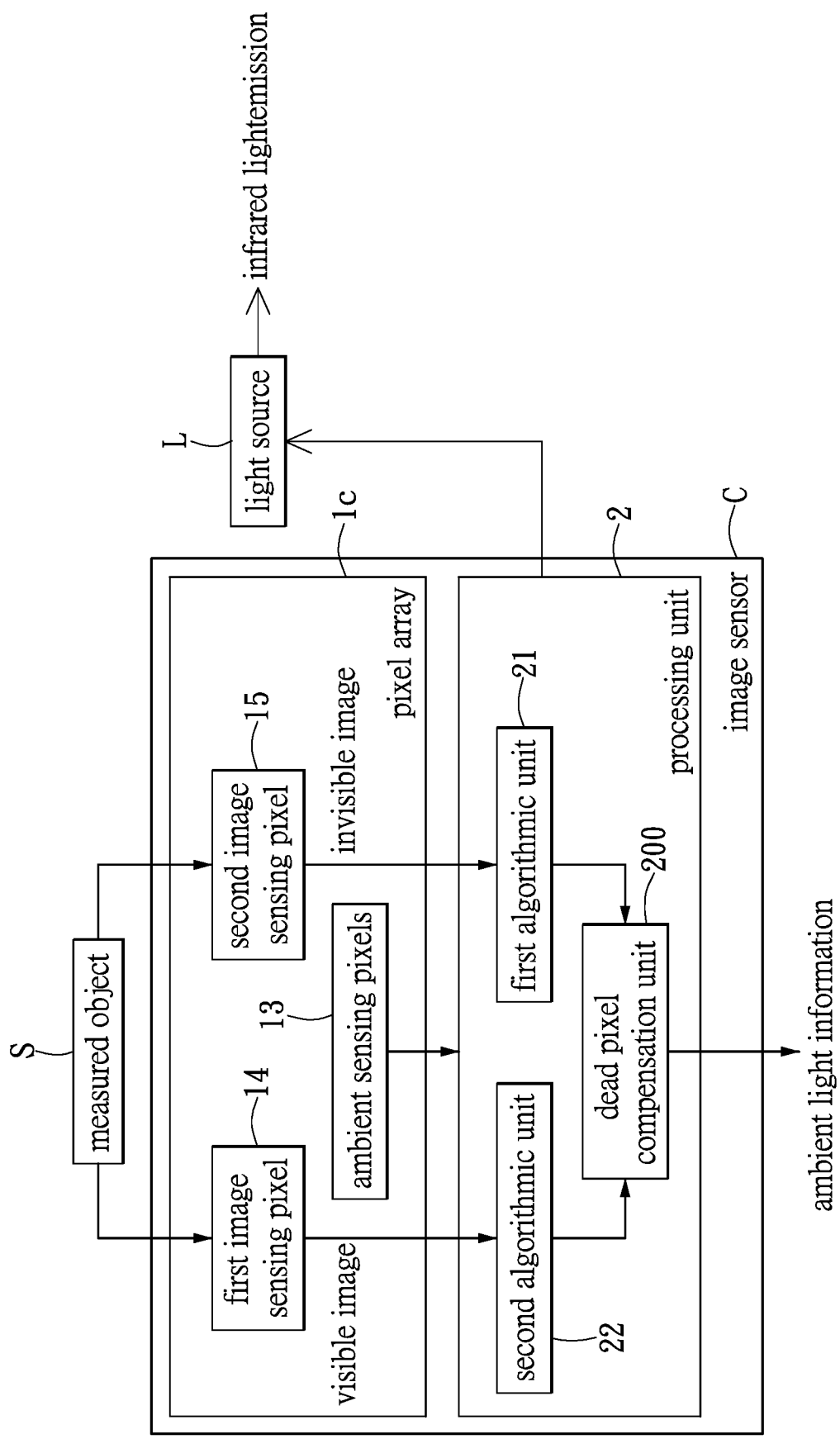
FIG. 9 shows a functional block diagram of detecting a measured object of a yet another embodiment in the instant disclosure.
Figure 10:
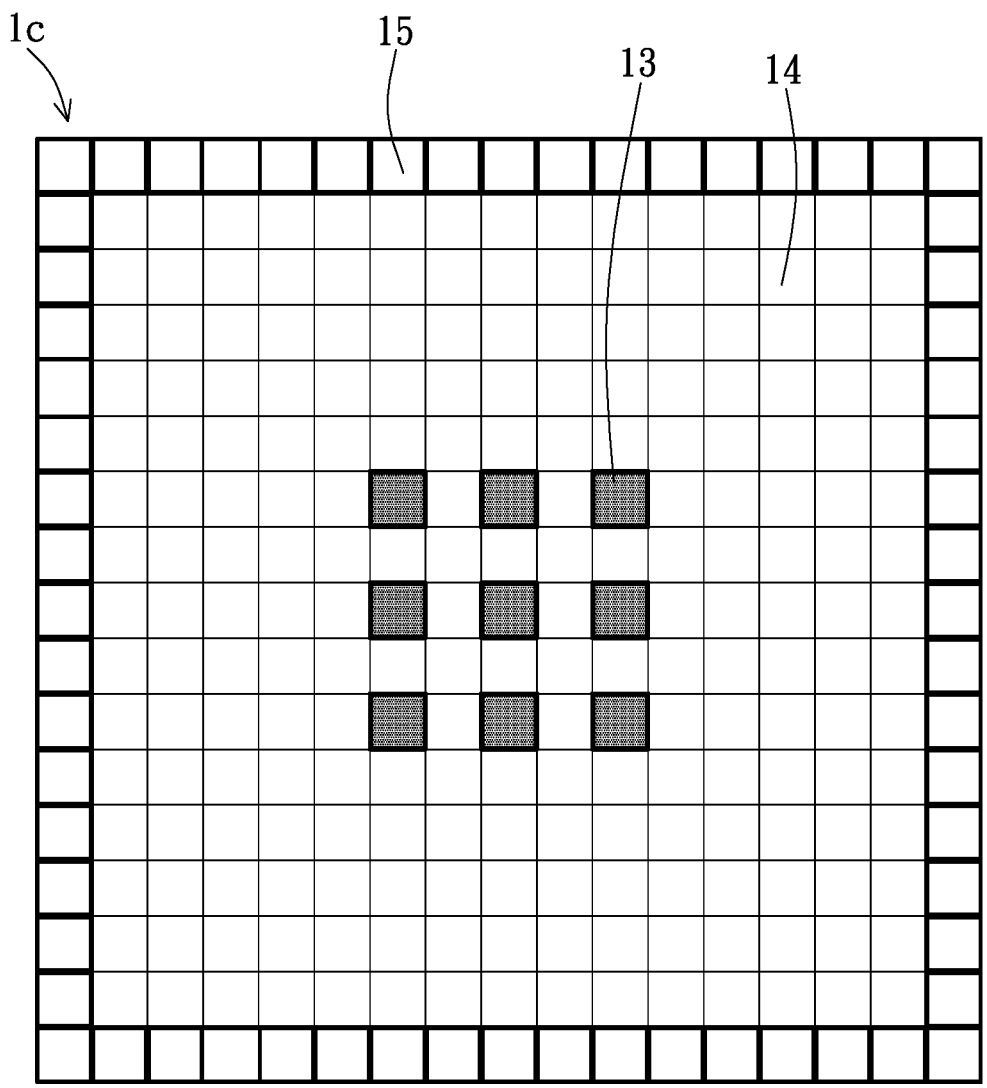
FIG. 10 shows a pixel array of an image sensor of a yet another embodiment in the instant disclosure.

Please refer to FIG. 9 and FIG. 10. FIG. 9 shows a functional block diagram of detecting a measured object of a fifth embodiment in the instant disclosure and FIG. 10 shows a pixel array 1c of an image sensor C of the fifth embodiment in the instant disclosure. The image sensor C of the fifth embodiment of this instant disclosure is similar with the image sensor B of the fourth embodiment of this instant disclosure, and the similarities are not repeated here. The difference between the image sensor C of the fifth embodiment and the image sensor B of the fourth embodiment in this instant disclosure is that, the pixel array 1c of the image sensor C of the fifth embodiment of this instant disclosure further includes a plurality of ambient sensing pixels 13, as shown in FIG. 10. The plurality of ambient sensing pixels 13 is disposed inside of the pixel array 1c, a number of a plurality of first image sensing pixels 14 disposed on the pixel array 1c is more than a number of the plurality of ambient sensing pixels 13 disposed on the pixel array 1c, and a plurality of second image sensing pixels 15 is surroundingly disposed on a periphery of the pixel array 1c. As an illustration, a number of the plurality of ambient sensing pixels 13 is nine in this embodiment, but it is not limited herein. It is noted that, the plurality of ambient sensing pixels 13 of this embodiment also can be surroundingly disposed on the periphery of the pixel array 1c, and the plurality of second image sensing pixels 15 also can be disposed inside of the pixel array 1c. That is, the disposed positions between the plurality of ambient sensing pixels 13 and the plurality of second image sensing pixels 15 can be exchanged.

For example, the plurality of ambient sensing pixels 13 can be the pixels not including a filter layer or a filter sheet, that is the pixels not including the filter layer with red, green, blue colors, or the plurality of ambient sensing pixels 13 can be the pixels with green filter layer. For instance, when the plurality of ambient sensing pixels 13 is used in a mobile phone, an external ambient light can be detected. When the ambient light is dark, a brightness of the mobile phone screen would be increased. When the ambient light is bright, the brightness of the mobile phone screen would be decreased. By this way, the users can watch the screen with proper screen brightness depending on the ambient light.

In addition, the image sensor C of the fifth embodiment of this instant disclosure is identical to the image sensor B of the fourth embodiment of this instant disclosure that includes the abovementioned dead pixel compensation unit 200. In this embodiment, the places disposed with the plurality of ambient sensing pixels 13 in the pixel array 1c are the places of dead pixels, and the dead pixel compensation unit 200 also can fix these dead pixels, such that the image sensor C is available to output a normal screen.

It is also to be noted that, the plurality of first image sensing pixels 14 can be the same or different from the plurality of visible image sensing pixels 12 of all of the abovementioned embodiments in this instant disclosure, and the plurality of second image sensing pixels 15 can be the same or different with the plurality of invisible image sensing pixels 11 of all of the abovementioned embodiments in this instant disclosure. In the fifth embodiment of this instant disclosure, the structure, function, and action mechanism of the plurality of first image sensing pixels 14 are similar to that of the plurality of visible image sensing pixels 12 of all of the abovementioned embodiments in this instant disclosure, and the structure, function, and action mechanism of the plurality of second image sensing pixels 15 are similar to that of the plurality of invisible image sensing pixels 11 of all of the abovementioned embodiments in this instant disclosure. Therefore, the similarities are not repeated herein.

Embodiments Efficacy

In summary, the benefit of the instant disclosure is that, in this instant disclosure, by providing a method and pixel array for detecting motion information at far distance and near distance ranges simultaneously, it can detect the motion information (e.g., gesture image) at near distance and far distance at the same time, so as to obtain a plurality of invisible images and a plurality of visible images that are alternatively arranged with each other. Therefore, when detecting the gesture image the conventional gesture recognition system can only conduct the alternative between near distance detection and far distance detection for detecting the gesture image, and cannot conduct the near distance detection and the far distance detection at the same time problem can be solved. In addition, in the method of detecting the gesture at far and near distances of this instant disclosure, an infrared light is used to emphasize determining a gravity center of the gesture image under a near distance condition, so as to increase an accuracy of determining the gesture image, and the limitation in the conventional gesture determination means can be overcome. Thus no matter far distance or near distance, the gesture can be correctly, rapidly, and unlimitedly determined. Furthermore, since the image sensor includes the pixel array and the processing unit of this instant disclosure, when the image sensor is under the second mode, the first image sensing pixels are in the resting state, and when the data detected by the second image sensing pixels is the moving information, the mode is switched from the second mode to the first mode. By switching between the second mode and the first mode the power consumption of the image sensor is saved.

Besides the above, the pixel array of the instant disclosure can be used in portable mobile devices such as a mobile phone, a media tablet, a bluetooth stereo speaker, in-vehicle, and the like. Via recognizing the gesture motion, the volume of sound can be adjusted, the next or previous music can be turned, and answer the phone can be answered or refused. It not only can expand the application of the human machine interaction, but also improve convenience of human machine interaction. Furthermore, it provides higher quality of lifestyle.

The descriptions illustrated supra set forth simply the preferred embodiments of the present invention; however, the characteristics of the present invention are by no means restricted thereto. All changes, alterations, or modifications conveniently considered by those skilled in the art are deemed to be encompassed within the scope of the present invention delineated by the following claims.

What is claimed is:

1. An optical sensor for detecting motion information, comprising:
   a pixel array, including a plurality of invisible image sensing pixels and a plurality of visible image sensing pixels for detecting motion of a measured object located in a first distance range or in a second distance range, wherein a plurality of invisible images are formed by the plurality of invisible image sensing pixels, and a plurality of visible images are formed by the plurality of visible image sensing pixels;
   a first algorithmic unit of a processing unit configured to analyze the plurality of invisible images, so as to obtain a motion information of the measured object within the first distance range; and
   a second algorithmic unit of the processing unit configured to analyze the plurality of visible images, so as to obtain the motion information of the measured object within the second distance range,
   wherein the first distance range is between 0 cm to 15 cm, and the second distance range is between 15 cm to 100 cm,
   wherein the processing unit is configured to initiate the plurality of visible image sensing pixels and the plurality invisible image sensing pixels to enter a first mode and a second mode,
   wherein in the second mode, the plurality of visible image sensing pixels are in a resting state, and the plurality of invisible image sensing pixels are in a working state, and in response to data being detected by the plurality of invisible image sensing pixels is the motion information, the processing unit is configured to initiate the plurality of visible image sensing pixels to enter the first mode,
   wherein in the first mode, the plurality of visible image sensing pixels are in the working state, and the plurality of invisible image sensing pixel are in the resting state,
   wherein a ratio of a number of the plurality of visible image sensing pixels to a number of the plurality of invisible image sensing pixels along one of lines of the pixel array is larger than or equals to 3, and the plurality of invisible image sensing pixels are disposed centrally in the pixel array.

* * * * *